United States Patent
Wiersma (10) Patent No.: US 8,306,259 B2
(45) Date of Patent: Nov. 6, 2012

(54) METHOD, SYSTEM AND DATA STRUCTURE FOR PROCESSING DOCUMENTS AND KIT FOR FINDING AND READING MARKINGS ON A DOCUMENT

(75) Inventor: Jelle Wiersma, Drachtster Compagnie (NL)

(73) Assignee: Neopost S.A., Bagneux (FR)

( * ) Notice: Subject to any disclaimer, the term of this patent is extended or adjusted under 35 U.S.C. 154(b) by 0 days.

(21) Appl. No.: 13/095,141

(22) Filed: Apr. 27, 2011

(65) Prior Publication Data

US 2011/0262000 A1 Oct. 27, 2011

Related U.S. Application Data

(62) Division of application No. 11/604,186, filed on Nov. 24, 2006, now abandoned.

(30) Foreign Application Priority Data

Nov. 23, 2005 (EP) .................................... 05077682

(51) Int. Cl.
*G06K 9/00* (2006.01)
(52) U.S. Cl. ....................................................... 382/101
(58) Field of Classification Search .................. 382/174, 382/100, 101
See application file for complete search history.

(56) References Cited

U.S. PATENT DOCUMENTS

| | | | |
|---|---|---|---|
| 4,034,341 A | 7/1977 | Isono et al. | |
| 4,357,596 A | 11/1982 | Feilchenfeld | |
| 5,751,843 A | 5/1998 | Maggioni et al. | |
| 6,266,431 B1 * | 7/2001 | Kiyono | 382/101 |
| 6,360,001 B1 | 3/2002 | Berger et al. | |
| 2002/0181777 A1 | 12/2002 | Sumikawa et al. | |
| 2003/0044044 A1 | 3/2003 | Emanuelsson et al. | |
| 2004/0131279 A1 | 7/2004 | Poor | |
| 2005/0067496 A1 | 3/2005 | Yen et al. | |
| 2005/0196074 A1 | 9/2005 | Deere | |

FOREIGN PATENT DOCUMENTS

DE 10021734 5/2001

(Continued)

OTHER PUBLICATIONS

IBM Technical Disclosure Bulletin, vol. 37, No. 02A, Feb. 1994; Location of Fail-to-Find Window after Image Processing. IBM Technical Disclosure Bulletin, vol. 34, No. 12, May 1992, Superimposed "X" and Address Box Location Probability Contours.

*Primary Examiner* — Claire X Wang
(74) *Attorney, Agent, or Firm* — Sughrue Mion, PLLC (57) ABSTRACT

A method for processing a document, including performing one or more processing steps with the document, such as printing, franking, assembling mail pieces, or opening received mail pieces. The method further includes defining a first possible location of a marking on a document; and searching a first part of a document for the marking, the first part corresponding to the first possible location. When the marking is not found in the first part a further possible location of a marking on a document is defined and a further part of the document for the marking is searched. The further part corresponds to the further possible location. The location of the marking with respect to the document is stored in the memory in case the marking is found in the first part or the further part. Information about the document is derived from the found marking. The derived information is presented at an output, for further processing of the information.

11 Claims, 4 Drawing Sheets

FOREIGN PATENT DOCUMENTS

| | | |
|---|---|---|
| EP | 0113556 A2 | 7/1984 |
| EP | 0639522 A1 | 2/1995 |
| EP | 0938066 | 8/1999 |
| EP | 1347372 A1 | 9/2003 |
| JP | 08153150 A | 6/1996 |
| WO | 2005/029392 A1 | 3/2005 |

\* cited by examiner

METHOD, SYSTEM AND DATA STRUCTURE FOR PROCESSING DOCUMENTS AND KIT FOR FINDING AND READING MARKINGS ON A DOCUMENT

PRIORITY CLAIM

This is a divisional application of U.S. patent application Ser. No. 11/604,186, filed Nov. 24, 2006, which application claims priority under 35 U.S.C. §119 to European Patent Application, EP 05077682.2, filed Nov. 23, 2005, the contents of the entirety of which is incorporated by this reference.

TECHNICAL FIELD

The invention relates to a method, a system and a data structure for processing documents, to a kit for finding and reading markings on a document.

BACKGROUND OF THE INVENTION

Systems for processing documents are known. Such systems can receive electronic documents, e.g., as print data, or as physical documents. In operation, the system performs one or more processing steps on the received documents, e.g., in order to print the documents, assemble the documents into mail pieces, to provide the documents with a franking value or otherwise.

During the processing, the received documents are searched to find a barcode marking provided to the document. The barcode can, for example, be used for tracking and tracing purposes. Depending on the system, the settings of the search process are either set manually or automatically.

For example, European patent publication 1 347 372, the contents of the entirety of which are hereby incorporated by this reference, discloses a method and device for printing and preparing mail from a data stream in which the settings are set manually. From amongst the data stream an identification criterion for various pages is selected and the data stream is analyzed to identify the pages concerned. The identification criterion is selected by displaying one or more pages on a display, and selecting by the user a geometric position of the data in the data stream, which serves as an identification criterion. However, a disadvantage of the method and device known from European patent publication 1 347 372 is the manual selection by the user. This disadvantage is especially troublesome in case different types of documents are processed with the system, e.g., with different sizes or different locations of the marking. This requires a manual adjustment of the settings every time a new type of document is processed in order to ensure that the area provided with the document is scanned.

U.S. Pat. No. 4,034,341, the contents of the entirety of which are hereby incorporated by this reference, discloses an automatic postal-code number reading system. The system has a pre-scanning section and a main scanning unit. In operation, the pre-scanning section performs a coarse pre-scan on a relatively broad area of a mail item. The pre-scanning section then determines the location of a postal code within the relatively broad area and delivers x and y coordinates of this location to the main scanning unit. The main scanning unit scans the smaller area defined by the x and y coordinates with a fine scan. The data resulting from the fine scan are transmitted to a character recognition circuit in which the postal code is recognized.

However, a disadvantage of the system known from U.S. Pat. No. 4,034,341 is that the geometrical position of the broad area has to be pre-defined, i.e., the geometrical position has to be defined before the pre-scanning section performs the pre-scan. Furthermore, scanning the relatively broad area requires a relatively large amount of time.

United States Patent application 2005/0067496, the contents of the entirety of which are hereby incorporated by this reference, discloses a method and system for extracting graphical barcodes from template-based documents. A scanner reads a hard copy of a template based document to produce a digital scanned image of the hard copy. The image is processed by a graphical barcode extractor to determine the type of document template the hard copy is based on. The graphical barcode extractor determines a location of a barcode candidate from the determined type of document template. The image is then cropped based on the location of the barcode candidate, and the cropped image is decoded to extract information.

However, a disadvantage of this method and system is that the template has to be pre-defined before the processing of the image to determine the template. Furthermore, processing of the image to determine the template and a barcode candidate requires a relatively large amount of type and processing power.

SUMMARY OF THE INVENTION

In certain embodiments, the invention provides a method for processing documents, in which the need to predefine the settings of a marking detection is obviated. One embodiment of the invention is a method for processing a document, including:
  performing one or more processing steps with the document, such as printing, franking, assembling to mail pieces, or opening received mail pieces;
  defining a first possible location of a marking on a document by selecting from a memory a location of a marking and setting the possible location in accordance with the selected location;
  searching a first part of a document for the marking, the first part corresponding to the first possible location;
  if the marking has not been found in the first part, repeatedly until the marking has been found or all the marking locations stored in the memory have been selected:
    defining a further possible location of a marking on a document by selecting from a memory a further location of a marking and setting the further possible location in accordance with the further selected location; and
    searching a further part of the document for the marking, the further part corresponding to the further possible location;
  if the marking has been found in the first part or the further part:
    storing the location of the marking with respect to the document;
    deriving information concerning the document from the marking found; and
    presenting the derived information at an output, for further processing of the information; or
  if, after all parts of the document corresponding to possible locations of the marking stored in the memory have been searched, the marking has not been found:
    searching a part of the document larger than the searched parts of the document for the marking.

With such a method, a self-learning effect can be achieved, since the location of the marking found is stored in the memory. Thus, the need of predefining the settings is obviated. Furthermore, a following time the method is performed, the part to be searched can be defined to correspond to one of the stored locations. Thus, the chance of finding the marking the following time is relatively high and accordingly the marking may be found in a relatively short time. Also, the method, may require less time compared to the above described prior art methods because a part of the document is searched which corresponds to the possible location of the marking. Hence, only a part of the document is searched, in which the chance of finding the marking is relatively high. Thus, the search can be performed automatically and will take less time compared to searching the whole area of the document.

Furthermore, the invention may be embodied in a system for processing a document, including:

at least one processing unit for performing one or more processing steps with a document, such as printing, franking, assembling to mail pieces or opening a received mail piece;

a search unit having an input connected to a memory for selecting a location of a marking from the memory; the search unit being arranged for:

defining a first possible location of a marking on a document by selecting from the memory a location of a marking and setting the possible location in accordance with the selected location; and searching a first part of a document for the marking, the first part corresponding to the first possible location;

the search unit further being arranged for, if the marking has not been found in the first part, repeatedly until the marking has been found or all the marking locations stored in the memory have been selected:

defining a further possible location of a marking on a document by selecting from the memory a further location of a marking and setting the further possible location in accordance with the further selected location; and searching a further part of the document for the marking, the further part corresponding to the further possible location;

the search unit further having an output connected to the memory, for storing the location of a found marking in the memory;

a processor connected to the search unit, for deriving information concerning the document from the marking found, which processor has a processor output at which data representing the derived information can be outputted for further processing of the information.

The invention may further be embodied in a kit for finding and reading markings on a document, including:

a memory in which data representing at least one prospective location of a marking on a document can be stored;

a search unit having an input connected to the memory for selecting a location of a marking from the memory; the search unit being arranged for:

defining a first possible location of a marking on a document by selecting from the memory a location of a marking and setting the possible location in accordance with the selected location; and searching a first part of a document for the marking, the first part corresponding to the first possible location;

the search unit further being arranged for, if the marking has not been found in the first part, repeatedly until the marking has been found or all the marking locations stored in the memory have been selected:

defining a further possible location of a marking on a document by selecting from the memory a further location of a marking and setting the further possible location in accordance with the further selected location; and searching a further part of the document for the marking, the further part corresponding to the further possible location;

the search unit further having an output connected to the memory, for storing the location of a found marking in the memory;

a processor connected to the search unit, for deriving information concerning the document from the marking found, which processor has a processor output at which data representing the derived information can be outputted for further processing of the information.

The invention may further be embodied in a memory in which a data structure for access by a data processing system is stored, the data structure including computer program code for, when run on a programmable data processing system:

causing one or more processing steps with the document, such as printing, franking, assembling to mail pieces, or opening received mail pieces to be performed;

defining a first possible location of a marking on a document by selecting from a memory a location of a marking and setting the possible location in accordance with the selected location;

causing a first part of a document to be searched for the marking, the first part corresponding to the first possible location;

if the marking has not been found in the first part, repeatedly until the marking has been found or all the marking locations stored in the memory have been selected:

defining a further possible location of a marking on a document by selecting from a memory a further location of a marking and setting the further possible location in accordance with the further selected location; and causing a further part of the document to be searched for the marking, the further part corresponding to the further possible location;

if the marking has been found in the first part or the further part:

storing the location of the marking with respect to the document;

deriving information concerning the document from the marking found; and presenting the derived information at an output, for further processing of the information; or if, after all parts of the document corresponding to possible locations of the marking stored in the memory have been searched, the marking has not been found:

causing a part of the document larger than the searched parts of the document to be searched for the marking.

Such a system, kit or data structure are specifically adapted for use in a method according to the invention.

Specific embodiments of the invention are set forth in the dependent claims.

Further details, aspects and embodiments of the invention will be described, by way of example only, with reference to the attached drawing.

DETAILED DESCRIPTION OF THE INVENTION

Figure 1:
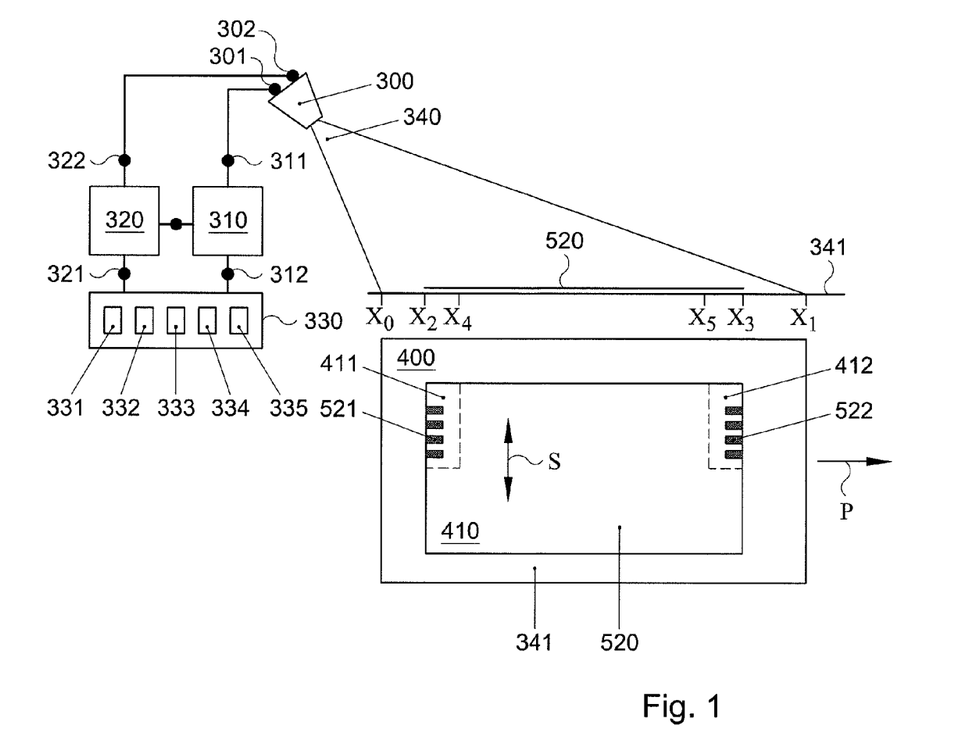
FIG. 1 schematically shows a block-diagram of an example of an embodiment of a sensor system.

The system shown in FIG. 1 has a search unit which in this example includes a sensor 300, and a control unit 310. The system further includes a memory 330 and a processor 320. In this example, the sensor control unit 310 is connected with a control unit output 311 to a sensor control input 301 of the sensor 300. The sensor control unit 310 is connected with a control unit input 312 to the memory 330. The processor 320 is connected with a processor input 322 to a sensor data output 302 of the sensor 300.

Figure 2:
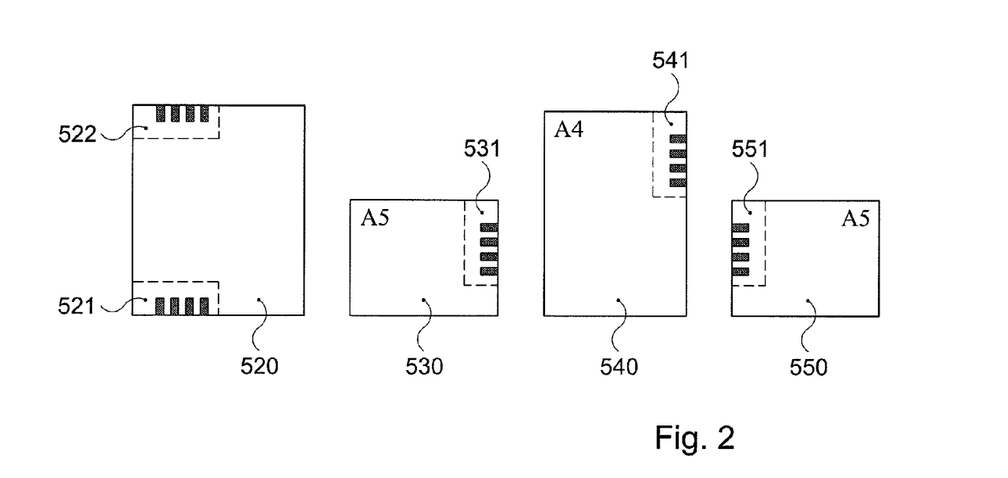
FIG. 2 schematically shows a number of documents provided with markings.

FIG. 2 schematically shows a number of documents 520-550 of a batch of documents to be processed. The documents 520-550 in a batch may have different sizes. In this example, the documents 520-550 are sheet-like shaped and have different sizes (in this example A4 (21 cm by 29.7 cm) and A5 (14.8 cm by 21 cm), respectively).

The shown documents 520-550 are provided with markings 521-551. In this example, the markings 521-551 represent information about the respective documents, and are provided on the documents 520-550 in the form of barcodes. As shown in FIG. 2, the position of the markings 521-551 may differ between documents, but this is not necessary. In FIG. 2, for example, a marking 521 is proved at the lower left corner of a document 520 of size A4, a marking 541 is provided in the upper-right corner of document 540 of size A4. A document 530 of size A5 is provided with a marking 531 extending over substantially the whole edge of the sheet at the right-hand side of the document. Another document 550 of size A5 is provided with a marking 551 extending over substantially the edge at the left-hand side.

Figure 3:
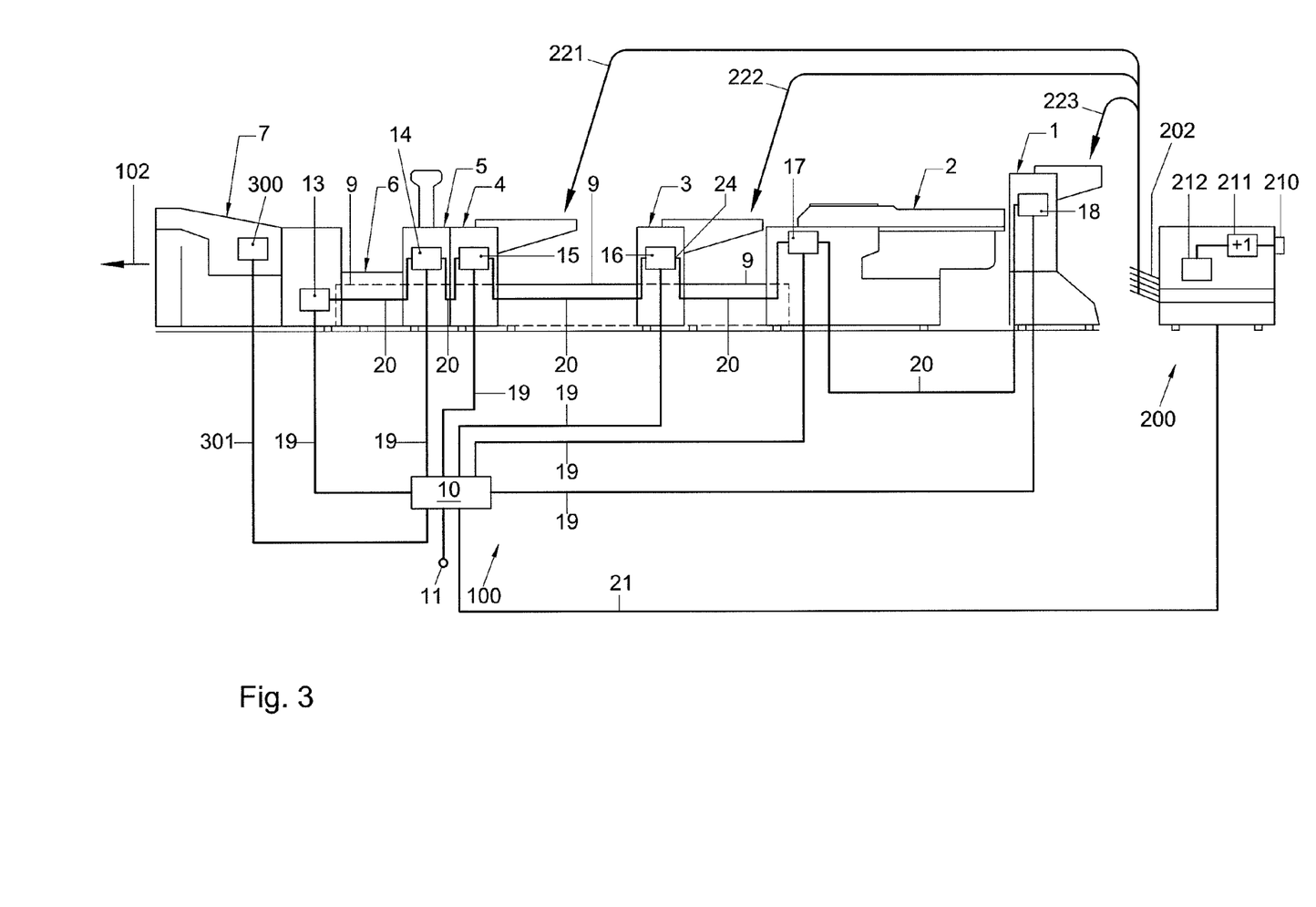
FIG. 3 schematically shows a side-view of an example of an embodiment of a system for processing documents.

During processing of the documents, for instance, by means of the example of a system shown in FIG. 3, the markings may be searched. The information represented by the markings may be used in the processing of the document or another operation, such as generating a mail manifest or otherwise. The system shown in FIG. 1 can be used to search the documents 520-550 for the markings 521-551. In FIG. 1, a document 520 provided with two markings 521, 522, in this example barcodes, is shown while being searched for the markings by the system. As is explained below, the system may perform an example of a method according to the invention to find one or more of the markings 521, 522.

In the example of FIG. 1, the sensor control unit 310 is arranged to define a possible location of a marking on a document being processed. In this example, location data sets 331-335 are stored in the memory 330. Each of the location data sets 331-335 represents a possible location of a marking on a document. The sensor control unit 310 defines a possible location of a marking by selecting from the memory 330 one of the location data sets 331-335.

In case the memory 330 is empty, i.e., no location data set is present in the memory 330, the sensor control unit 310 defines the possible location of the marking to be a default location. In this example, the default location consists of the entire part of the document that can be searched by the system. In case the document is a physical document, the default location may, for example, consist of the entire surface of the document visible to an optical scanner. In case the document to be searched is an electronic document, the default location may, for example, be the entire electronic document.

The sensor control unit 310 is arranged to control the operation of the sensor 300 such that the sensor 300 searches a part of the document corresponding to the defined possible location. To that end, the sensor control unit 310 transmits suitable control signals via the control unit output 311 and the sensor control input 301 to the sensor 300. The sensor 300 searches a part of the document 520 corresponding to the defined possible location for the marking 521, 522. In this example, the sensor 300 generates an image of the search location and transmits data representing the image of the searched part to a processor 320 via the sensor data output 302 and a processor input 320.

The processor 320 searches the received data for the marking. In case the marking 521,522 is found, the processor 320 derives information about the document 520 from the data received from the sensor 300. The processor 320 presents at the processor output 321 data representing the derived information. This information may then be used in further data processing, for example to track the transport of the document 520 along a processing path thereof, to determine whether or not the document 520 has been processed correctly or any other application suitable for the specific implementation.

The processor 320 further transmits data representing the location of the found marking 521,522 to the sensor control unit 310. The sensor control unit 310 generates a new location data set at least containing the location of the found marking 521,522. The new location data set is stored in the memory 330 in case there is no location data set 331-335 present in the memory 330 which already represents the location of the found marking 521,522. Together with the location of the found marking, the sensor control unit 310 may store additional data in the new location data set. The additional data may for example include information about the document on which the marking was found, such as size, type, etc. The additional data may further include information about the marking, such as the type of marking or other suitable information.

As shown in FIG. 1, the sensor 300 has a sensor window, from hereon referred to as the scan window 340, within which the sensor 300 can perceive an object. Objects positioned outside of the scan window 340 will not be perceived by the sensor 300. In FIG. 1, a surface 341 is present of which a part lies within the scan window 340, in FIG. 1 this is the part of the surface 341 between $x_0$ and $x_1$. From hereon, the part of the surface 341 within the scan window 340 is referred to as the scan area 400.

In the example of FIG. 1, the document to be searched is a physical document 520 provided with markings 521,522. The document 520 is positioned on the surface 341, inside the scan area 400. The area occupied by the document 520 in the scan area 400 is from hereon referred to as the document area 410. In FIG. 1 the document area 410 extends between coordinates $x_2$ and $x_3$ within the scan area 400.

In this example, upon initialization, the sensor 300 determines the location of the document area 410 within the scan area 400. For example, the surface 341 may have a distinct color or pattern, which differs from that of the document 520, and the sensor 300 may be arranged to determine from this difference the part of the surface 341 occupied by the document and define the document area 410 accordingly. For example, by searching the scan data for parts with the distinct color or pattern and limiting the area to the parts not having this color or pattern. For instance, in FIG. 1, the sensor 300 may define the document area 410 as being the part of the scan area 400 between coordinates $x_2$ and $x_3$.

The document area 410 may also be defined by the sensor 300 based on processing data received by the sensor 300. E.g., the processing data may describe how a document is to be processed by a processing unit. The sensor 300 may then derive from the processing data which part of the scan area 400 might be occupied by a document and define the document area 410 accordingly.

For example, the processing data may define that physical documents with a certain size, e.g., A4 (21 cm by 29.7 cm) and A5 (14.8 cm by 21 cm), will be processed into mail pieces of certain size, e.g., A5, and may specify the mail piece (e.g., which annexes, envelop type, etc.). The sensor 300 may then, for example, determine that e.g., the physical documents will be positioned in the scan area 340 at a certain location during the processing and set the document accordingly. For example, the sensor 300 may determine from the processing data that physical documents of A4 size enter the scan area 430 in landscape position, and the physical documents of A5 size in portrait position. The sensor 300 may then define that the document area 341 has substantially the width of the scan area and extends in the longitudinal direction 30 cm from an entrance side of the scan area (at which entrance side the documents enter the scan area).

The sensor 300 may define the document area 410 at initialization only. For example, for a batch of documents being processed, the sensor 300 may set the document area 410 to remain the same during processing of the batch. However, the sensor 300 may also define the document area 410 dynamically and redefine the document area 410 for each document to be searched, for example using the processing data.

In the example of FIG. 1, the document area 410 and/or scan area 400 are defined in terms of length and width of a surface. However, the document area 410 may also be defined as a time during which the document 520 passes through the scan area 400. For instance, in case the sensor 300 is implemented as a line scan camera, the document area 410 may be defined in terms of the width of the scan area 400 occupied by the document 520 and the time it takes for the document 520 to pass through the, line-shaped, area scanned by the line scan camera.

In the example of FIG. 1, initially the memory 330 is empty. Upon initialization, the sensor control unit 310 defines the possible location of the marking to be the default location, e.g., to consist of the whole document area 410. The sensor 300 searches the whole document area 410 for the marking 521,522. Since the whole document area 410 is searched, the marking 521,522 will be found. The sensor 300 determines the location of the found marking in the document area 400, e.g., between coordinates $x_2$ and $x_4$ or between coordinates $x_3$ and $x_5$ in the example of FIG. 1. The location is then stored in the memory 330, as has been described above. Thus, in case a following document is processed, in the memory 330 a location data set is present.

For a following document, the sensor control unit 310 selects a location data set 331-335 stored in the memory 300. In case more than one location data set 331-335 is present in the memory 330, the sensor control unit 310 uses a predetermined selection criterion. For example, the sensor control unit 310 may select the location data set 331-335 which corresponds to the location of a marking found on a directly preceding document or select the location data set 331-335 which corresponds to a location in which a desired marking has been found most often.

Also, the sensor control unit 310 may receive document-processing instructions, and determine from the processing instructions information about the document and select the first possible location and/or second possible location taking the determined document information into account. For example, when the processing instructions reveal that the document is not folded, from the envelop size, the maximum size of a document may be determined, e.g., for a C4-envelope the maximum is A4-size.

For example, the size of a document may be determined prior to the searching, for example from received processing instructions, and a location set may be selected taking the determined document size into account. For instance, one or more location data sets 331-335 may contain document size information and the sensor control unit 310 may select a set of which the document size information matches the determined size of the document.

After a location data set has been selected, the sensor control unit 310 defines the possible location of the marking in accordance with the location information in the set. The sensor 300 searches the part of the document area 410 corresponding to the defined possible location. For instance, in FIG. 1, the sensor 300 searches a first part 411 of the document area 410 corresponding to a first possible location, e.g., between coordinates $x_2$ and $x_4$ in FIG. 1. If the marking is found in the first part 411, the sensor outputs the information about the marking to the processor 320, as has been described above.

When the marking is not found in the first part 411, the sensor 300 sends a "not found" message to the sensor control unit 310. The sensor control unit 310 selects a following location data set in response to the "not found" message, and defines a second possible location corresponding to location information in the following location data set. The sensor 300 then searches a second part 412 of the document area 410 corresponding to the second possible location, e.g., between coordinates $x_3$ and $x_5$. In case the marking is not found in the second part 412, the sensor control unit 310 is informed by the sensor 300 and another possible location is defined, until either the marking is found on the document or all location data sets have been used.

In case all location data sets 331-335 stored in the memory 330 have been used, and the marking was not found, the sensor control unit 310 defines a final possible location which is larger than the combined parts that have already been searched. The final possible location may consist of the whole document area 410 or the whole scan area 400. In case the marking is within the scan window 340, the marking will then be found by the sensor 300 and its location be stored in the memory 330. Thus, for a successive document, the part of the document area 410 corresponding to this location can be searched. There is a relatively large chance that, for the successive document, the location of the marking corresponds to the location of a marking found on a preceding document. Thus, it is likely that the marking can be found without searching the whole document. Thereby, the amount of time and processing power required to find the marking is reduced.

Searching the part or parts of the document may be performed in any suitable manner. The searching may, for example, include scanning at least the respective part of the document 520, and processing the scan data obtained during this scanning in order to find the marking.

In the scanning, for example, a part of the document 520 larger than the part corresponding to the defined possible location may be scanned, e.g., in FIG. 1 the whole document area 410. Thereby, the settings of the scanning may remain the same for a number of searches. In the processing part of the search, only data obtained from scanning the part of the document 520 corresponding to the defined marking location may be processed, and scan data obtained from other parts of the document 520 may be disregarded. The amount of time and processing power required to find a marking is found to depend significantly on the processing of the scan data.

Accordingly, the amount of data to be processed is reduced significantly in this manner.

However, it is also possible to scan only the part of the document 520 or document area 410 corresponding to the defined possible location. For instance, in case the scanning requires a relatively large amount of time, scanning only that part reduces the amount of time required to search for the marking.

The searching of parts of the document corresponding to different defined locations of the marking may have an overlap in time. For example, searching a part of the document 520 may at least partially be performed during processing of scan data obtained from another part of the document. In such case, for instance, the scan data obtained from the searching the second part may be stored in a buffer memory until the data obtained from the first part are processed. Thereby, the amount of processing power required is reduced. Also, the processing of the document is not hampered by the search, since, after the scanning operation, the document itself can be processed further while the scan data obtained from the document is being processed separately.

A single scanning run may for instance be performed, after which the scan data is stored in a buffer memory. The scan data obtained from the part of the document corresponding to the first possible location may then be processed first. In case the marking is not found, the scan data obtained from the part of the document 520 corresponding to the second possible location may be processed thereafter. This may be repeated with scan data obtained from different parts of the document 520, until the marking is found in the scan data.

Furthermore, scan data obtained from different parts of the document 520 may be processed simultaneously. Thereby, the amount of time required for the processing is reduced. However, compared to a consecutive processing of data obtained from different parts, the 30 amount of required processing power is increased.

The scanning may be performed in any suitable manner. In the scanning, for example, a digital image may be obtained from at least a part of the document to be searched. For instance, the document may be scanned optically, for instance using a camera. However, the document may also be scanned electronically. For instance, in case the document is an electronic document, the sensor 300 may be arranged to receive data representing the electronic document and scan the part of the electronic document corresponding to the location defined by the sensor control unit 310.

For example, document data representing the electronic document may be received by the sensor. The document data may, for example, be a set of data readable by a printer, such as a post-script document. From the received document data an image of at least a part of the document corresponding to the defined first part and/or the second part may be rendered by the sensor 300. The rendered image may then be processed to find the marking. It should be noted that rendering an image from document data is known in the art of image processing, and for the sake of brevity not described in further detail.

In case the document is an electronic document, the part corresponding to a defined possible location may extend along more than one page. For example, in the scanning a single image which represents the appearance of a multiple of pages may be rendered. For instance, when no possible location data set is present in the memory, an image of the entire document may be rendered and processed.

The scan data obtained in the scanning may thereafter be processed in order to find marking data which represent the marking. For example, when a digital image has been generated which represents the appearance of the scanned part of the document, the image may be processed to find the marking. In case the marking is a barcode, for instance, the image may be searched for two parallel lines with a length corresponding to the height of the barcode or any other suitable indicia. For example, the scan data may be scanned for a pattern specific for the type of marking. The pattern may for example be a part of the marking not representing information. For instance, 1-d barcodes typically include a pattern of two parallel lines defining the direction and position of the 1-D code, whereas 2-D barcodes include a pattern of two perpendicular lines forming a coordinate system.

The location of the marking may then be determined in terms of the matrix coordinates of the marking in the image. Supposing, for example, that the digital image has a matrix size of 1024 by 768 pixels and the marking occupies a 20 by 30 pixel part at the upper left of the image, the location of the marking can be determined as the area between image pixel coordinates (0,0), (0,20), (30,0), and (30,20).

In the example of FIG. 1, the document 520 includes two markings 520,521. However, the document 520 may also be provided with more than two or less than two markings. In case the document includes more than one marking, it may be determined whether or not a found marking is of a desired type, and, in case the found marking is not of a desired type, the method may be continued as if no marking has been found, until a marking of the desired type is found. For example, the above-mentioned pattern specific for the type of marking may be determined and in case the pattern does not match with the desired type, the method may be continued. However, it is also possible that the data represented by the marking is searching for a predefined type-identifying code. For example, the data may be searched for a sequence of digits, e.g., 3 binary zeros, identifying the type of marking. The predefined type-identifying code may for example be present at a predetermined position in the sequence of data represented by the marking, e.g., for example at the beginning or at the end of the sequence.

FIG. 3 schematically illustrates an example of an embodiment of a system for processing documents. In this example, the system is arranged to generate mail items. The system may e.g., perform a method according to the invention. The shown system includes a printer 200 for printing a document. A mail piece assembler 100 is positioned, in a processing direction of the at least one document, downstream of the printer 200. The mail piece assembler 100 can receive the printed document, as schematically indicated with arrows 221-223. The mail piece assembler 100 can assemble the printed document, and optionally additional documents, into a mail item, as will be explained below in more detail. Upstream of the printer 200, the system may further include a document generator (not shown) for generating document data and providing the document data to the printer 200. The printer 200 may then print a physical document with the content and/or layout defined by the document data.

The mail piece assembler 100 includes a number of successive processing stations 1-7. The processing stations 1-7 are in a processing direction of the documents, and in that order: a supply station 1 for supplying separates sheets, a collecting station 2, a first and second supplement supply station 3 and 4, a folding station 5, a transport unit 6 and an inserter station 7. The mechanical components of the shown assembler 100 may, for example, be implemented as stations which resemble substantially the construction of stations sold by the applicant under the name "SI-92".

It should, however, be noted that many other arrangements of processing stations can be used, and the invention is not limited to the shown example. In particular, depending on the desired end product, processing stations may be added or removed. Furthermore, the position of one or more of the processing stations in the processing direction may be changed. For example, the supplement supply stations 3 and 4 may be replaced by another type of station. It is also possible to replace the supply station 1 and the collecting station 2 with a single station or to make other adjustments.

In the example, the supply station 1 is constructed to supply separate sheets to the collecting station 2. In the collecting station 2, the sheets received from the supply station 1 may optionally be collected to stacks of sheets, each of which, for example, may form a set of documents to be formed into a single mail piece. The sheets or stacks of sheets can subsequently be passed through supplement-supply stations 3 and 4, during which, if desired, supplements are added to the sheets or the stacks of sheets. In the folding station 5, the sheets and optional supplements are folded. When the sheets and supplements have been collected in a stack, the sheets and supplements are folded together, i.e., as a stack. The transport unit 6 includes a transport track 9, to which the inserter-station 7, the folding station 5, the supplement-supply stations 3, 4 and the collecting station 2 are mounted.

The example shown in FIG. 3 further includes a central control unit 10 and a number of station control units 13-18. Each of the station control units 13-18 is connected to one of the stations 1-7. The station control units 13-18 are connected to the central control unit by means of data communication connections 19. The central control unit 10 may send control commands to the respective station control units 13-18, via the data communication connection 19. Based on the received control commands, the respective station control unit 13-18 controls the operation of the respective station 1-7. In FIG. 2, the central control unit is further connected to the printer 200 via a data communication connection 21.

The station control units 13-18 are further mutually connected by means of a module communication connection. Via which the station control units 13-18 next to each other can exchange information, for example that a sheet is presented by a station to a station further down in the processing direction.

Figure 4:
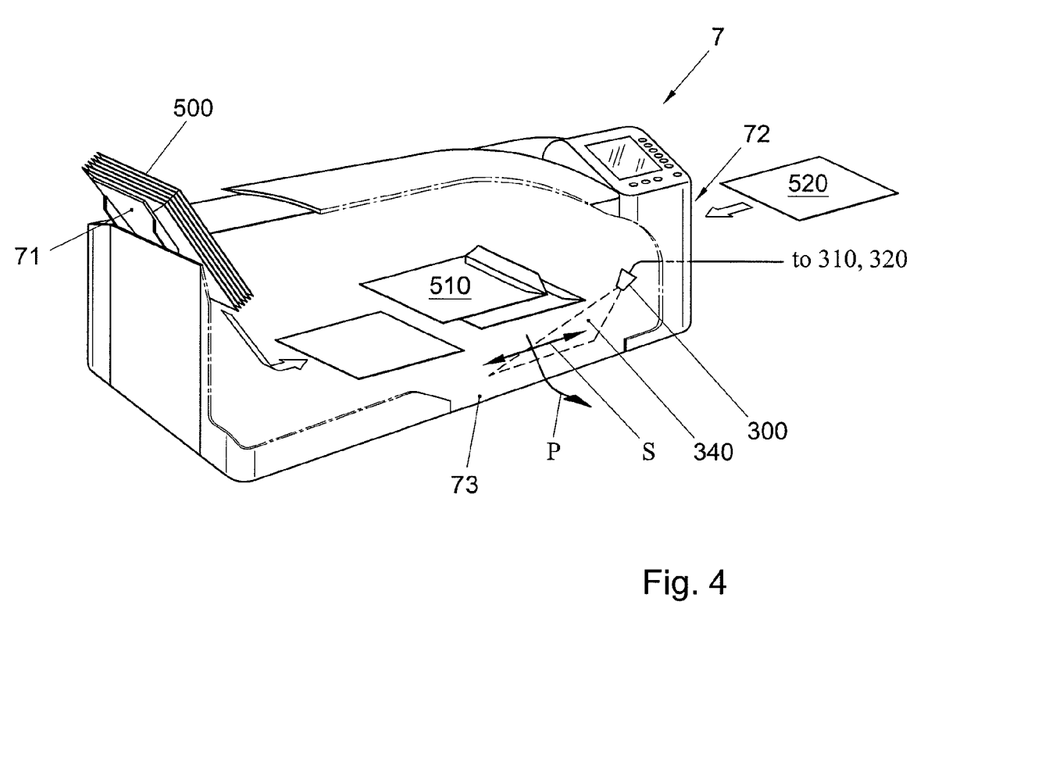
FIG. 4 schematically shows an example of an embodiment of a processing unit which may be used in the example of FIG. 3.

One ore more of the stations 1-7, and/or the printer 200 in the system shown in FIG. 3 may be provided with a system for finding a marking. In the example of FIG. 3 for instance, the inserter station 7 is provided with such a system. As shown in FIG. 3, the sensor 300 is connected via a sensor communication connection 301 to the central control unit 10. In the central control unit 10, the sensor control unit 310, the memory 330 and the processor 320 are implemented. Via the sensor communication connection 301, data can be exchanged between the sensor 300 and the central control unit 10, such as data representing a digital image of the document, control data for controlling the operation of the sensor 300 or other suitable data. FIG. 4 schematically shows an example of an inserter station 7. The shown inserter station 7 may, for instance, be implemented with a mechanical construction similar to that of the inserter station marked by the applicant under the name "IN-3".

The inserter station 7 includes an envelope supply 70 via which envelopes 500 are provided to the inside of the inserter station 7. In operation, the envelopes 500 are supplied with documents 520 provided at a document input 72. As shown, the envelopes 500 are opened, and one or more documents 520 are inserted in the envelope 500. The documents may or may not have been folded before inserting. The filled envelopes 510 are then discharged from the inserter station 7 via a mail piece exit 73. Inserter stations are known in the art of mail processing systems, and for the sake of brevity, the mechanical aspects of the insert station 7 are not described in further detail.

As shown in FIG. 4, the station 7 may be provided with a sensor 300 and additional circuitry, for instance near the mail piece exit 73. In this example, the sensor 300 includes a line-scan camera which optically scans a document, i.e., in this example the filled envelop 510, in a scan direction S transverse to the processing direction P. More specific, the line-scan camera scans a line of the document-oriented transverse to the processing direction P, and since the documents move in the processing direction P can scan a 2-dimensional area. In this example the scan area is defined in terms of a period of time required for (a part of) a document to pass through the scan window 340. The sensor 300 obtains optical scan data representing the optical appearance of (a part of) the filled envelope 510, which is processed to find the marking, for example in a manner as has been described before with reference to the example of FIGS. 1 and 2.

The invention is not limited to implementation in the disclosed examples of units, devices and systems, but can likewise be applied in other units, devices and systems. In particular, the invention is not limited to physical devices or units implemented in nonprogrammable hardware but can also be applied in programmable devices or units able to perform the desired device functions by operating in accordance with suitable program code. Furthermore, the devices may be physically distributed over a number of apparatuses, while logically regarded as a single device. For example, the central control unit 10 of the document processing system shown in FIG. 3 may be physically implemented as a number of hardware devices arranged to perform the functions of the central control unit 10. Also, devices logically regarded as separate devices may be integrated in a single physical device. For example, the units 310,320 of the system shown in FIG. 3 can be implemented in a single processor able to perform the functions of the respective units.

The invention may also be implemented in a computer program for running on a computer system, at least including code portions for performing steps of a method according to the invention when run on a programmable apparatus, such as a computer system or enabling a programmable apparatus to perform functions of a system according to the invention. Such a computer program may be tangible embodied in a data carrier, such as a CD-ROM or diskette, stored with data loadable in a memory of a computer system, the data representing the computer program or any other type of article of manufacture suitable for the specific implementation. The data carrier may further be a data connection, such as a telephone cable or a wireless connection transmitting signals representing a computer program according to the invention.

Figure 5:
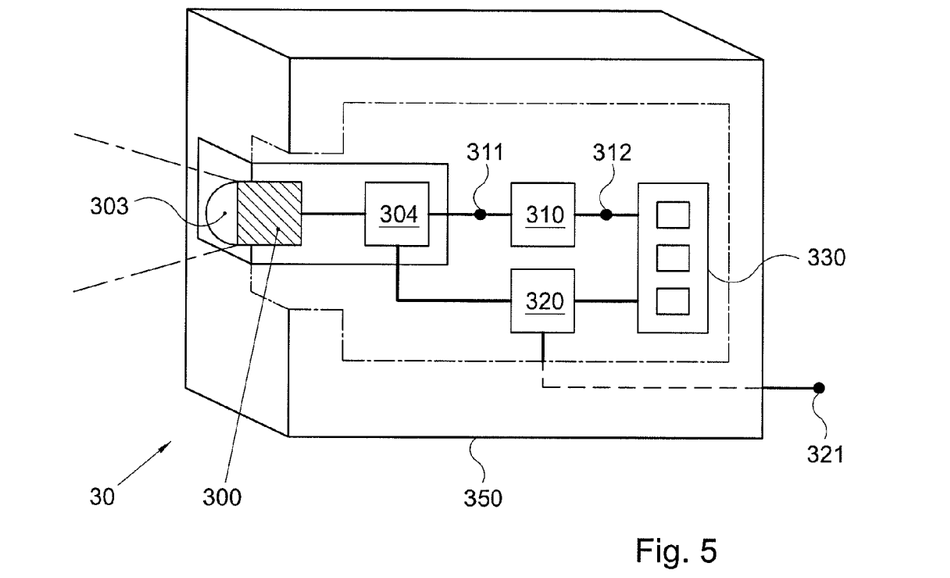
FIG. 5 schematically shows a first example of an embodiment of a kit for finding 10 markings on a document.
Figure 6:
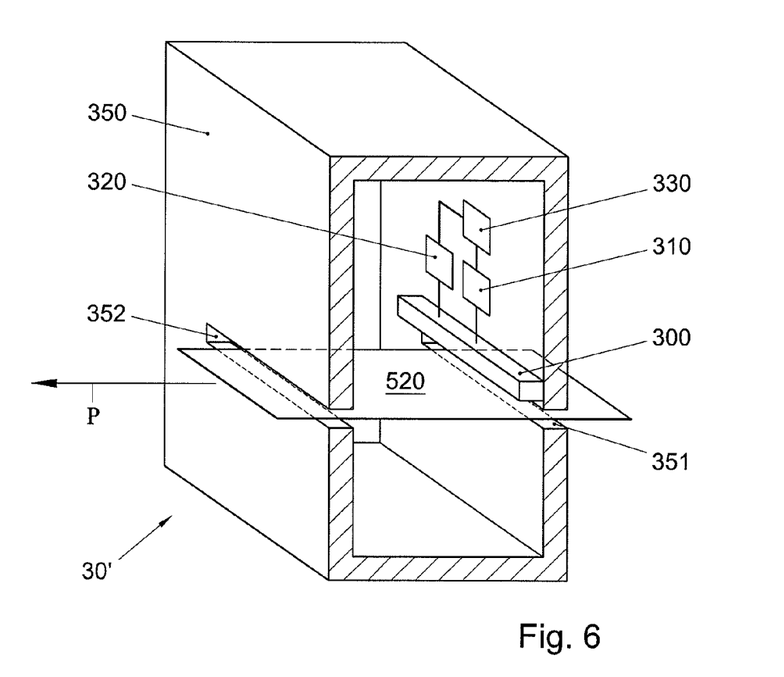
FIG. 6 schematically shows a second example of an embodiment of a kit for finding markings on a document.

For example, in FIG. 1 the system is shown in an operational state, however, the system may also be provided as a kit for finding markings on a document. Such a kit may, e.g., be mounted on a processing unit in order to obtain the advantages of the invention. In the examples of FIGS. 5 and 6, the components of the kit are shown in a connected state. However, the kit may also be provided as a set of separate components that are connectable to each other, e.g., as a set of a sensor and an electronic circuit arranged to search data generated by the sensor for the markings at the selected locations.

FIGS. 5 and 6 show examples of kits for finding markings on a document. As shown in FIGS. 5 and 6 such a kit may include a memory 330 in which data representing one or more possible locations of a marking on a document can be stored and a search unit, formed in the examples by a sensor 300 and a sensor control unit 310. The search unit is arranged to define a first possible location of a marking on the document and to search a first part of a document for the marking. The first part corresponds to the first possible location. The search unit is further arranged to define a second possible location of a marking on the document in case the marking is not found in the first part and to search a second part of the document for the marking, said second part corresponding to the second possible location.

In the examples of FIGS. 5 and 6, the sensor control unit 310 is connected via an input/output 312 to the memory 330 for selecting a location of a marking and defining the first possible location or the second possible location corresponding to the selected location. The sensor control unit 310 can further store the location of a found marking in the memory 330 via the input/output 312. The kit further has a processor 320 connectable to the search unit, in this example to the sensor 300 for deriving information about the first document from the found marking. The processor can output data representing the derived information, for further processing of the information. The processor 320 is connected to the sensor control unit 310 to send information to the sensor control unit 310 about a found marking.

In the example of FIG. 5, the kit is implemented as a camera, which can generate an image of a document. The camera includes a housing 350. The sensor control unit 310, the processor 320, the memory 330 and the sensor 300 are provided in the inside of the housing 350. The camera includes an optical sensor 300 with an optical element 303 for converting electromagnetic radiation into signals. The optical element 303 is connected to a processor 304 which generates data suitable to be processed by the processor 320, from the signals received from the optical element 303.

In the example of FIG. 5, the camera can search a document outside the housing 350. The example of FIG. 6 can search a document passing from an inlet slit 351 to an outlet slit 352 of the housing. As shown a sensor 300 is provided such that a document passing through a document passage between the inlet 351 and the outlet 352 can be searched. The sensor 300 is positioned nearby the inlet 351. In this example the sensor 300 has an elongated shape and is positioned in parallel to the longitudinal direction of the slit. A document passing from the inlet 351 to the outlet 352 will be searched for a marking by the sensor and the circuitry described in 30 the above. The example of FIG. 5 or 6 can for example be mounted on an existing document processing apparatus. For instance, the example of FIG. 6 can be mounted with the inlet communicating with the mail piece exit 73 of FIG. 4.

In the foregoing specification, the invention has been described with reference to specific examples of embodiments of the invention. However, various modifications and changes may be made. The specifications and drawings are, accordingly, to be regarded in an illustrative rather than in a restrictive sense. For example, the marking may represent any information suitable for the specific implementation, and for example represent an identifier of a document, or processing instructions for a document processing apparatus, or archiving instructions or any other suitable information.

Also, the markings may be provided on the physical document in any manner suitable for the specific implementation, and may, for example, include a barcode. In a barcode, a number of (alpha)numerical signs is converted into a number of signs of variable length, and sometimes a variable distance between the signs. To read a barcode, the sign, as well as the size thereof is determined, either in one dimension (in which case the barcode is referred to a 1-15 dimensional barcode) or in two dimensions (in which case the barcode is referred to a 2-dimensional barcode). The marking may also include (alpha)numerical signs or other suitable types of markings. A barcode is a pattern of (parallel) bars and spaces of various widths that represent data elements or characters. The bars may, for example represent strings of binary ones and the spaces strings of binary zeros. A "one-dimensional" barcode contains a series of bars and spaces that vary only in a single dimension, e.g., in height. In a "two-dimensional" barcode, the information storage capacity is increased relative to one-dimensional barcodes by varying the barcode patterns in two dimensions. Common two-dimensional barcode standards include PDF417, Code 1, and Maxicode. One-dimensional and two-dimensional barcode symbols typically are read by optical scanning techniques (e.g., by mechanically scanned laser beams or 25 by self-scanning charge-coupled devices (CCD's)) that convert a printed barcode symbol into electrical signals. The electrical signals are digitized and decoded to recover the data encoded in the printed barcode symbol.

The marking may, for example, also include OMR (Optical Mark Recognition) marking. In an OMR marking, the signs are binary, i.e., at each reserved sign position either a sign is present or not. The presence of a sign at a reserved sign position has a predetermined meaning, e.g., a binary one or a binary zero. By combining a number of sign positions, the number of possibilities in increased, e.g., using 16 signs there are 65536 possibilities.

Furthermore, any suitable type of sensor may be used, such as an optical camera, an infra-red camera, an electronic document scanner arranged to scan electronic document data or any other suitable type of sensor. However, other changes and modifications are also possible. The mere fact that certain measures are recited in mutually different claims does not indicate that a combination of these measures cannot be used to advantage.

What is claimed is:

1. A method for assembling mail items from a batch of documents, comprising:
   providing at least one processing unit for performing at least one processing step with the document and a search unit comprising a memory;
   for an initial document in the batch:
      the search unit obtaining image data representing an image of the initial document;
      the search unit performing a search operation of the image data of the initial document to locate a marking representing document-processing instructions and reading the document-processing instructions;
      storing a location data set indicative of the location of the marking in the memory; and
      the processing unit performing on the initial document one or more processing steps according to the document-processing instructions so as to assemble a mail item;
   for each later documents in the batch:
      the search unit obtaining image data representing an image of the later document;
      the search unit performing a search operation of a portion of the image data of the later document corresponding to the location defined by the stored location data set to locate a marking representing document-processing instructions and reading the document-processing instructions; and
      the processing unit performing on the later document one or more processing steps according to the document-processing instructions so as to assemble a mail item.

2. A method as in claim 1, wherein the markings are at least machine readable.

3. A method as in claim 1, wherein the obtaining step comprises scanning at least the respective part of the document.

4. A method as in claim 3, further including defining a document area to be scanned.

5. A method as in claim 4, further including determining a scan window, determining a position of a document to be scanned within the scan window, and defining a document area within the scan window corresponding to the determined position of the document.

6. A method as in claim 1, wherein said one or more processing steps includes printing or franking.

7. A method as in claim 1, wherein the markings each represent information about the document.

8. A method as in claim 7, wherein the information is used for registering or tracking the documents.

9. A method as in claim 1, wherein the markings comprise 1-D or 2-D barcodes, alphanumerical signs and/or Optical Mark Recognition markings.

10. A system for assembling mail items from a batch of documents, comprising:
   at least one processing unit for performing at least one processing step with the document and a search unit comprising a memory;
   the search unit being configured to:
   for an initial document in the batch:
     obtaining image data representing and image of the initial document;
     performing a search operation of the image data of the initial document to locate a marking representing document-processing instructions and reading the document-processing instructions; and
     storing a location data set indicative of the location of the marking in the memory;
   for each later document in the batch:
     obtaining image data representing an image of the later document; and
     performing a search operation of a portion of the image data of the later document corresponding to the location defined by the stored location data set to locate a marking representing document-processing instructions and reading the document-processing instructions; and the at least one processing unit being arranged for performing;
     on the initial document, one or more processing steps according to the document-processing instructions read from said document, so as to assemble a mail item; and
     on each of the later documents, one or more processing steps according to the document-processing instructions read form said document, so as to assemble a mail item.

11. A non-transitory computer-readable medium in which a data structure for access by a data processing system is stored, the data structure comprising computer program code for, when run on a programmable data processing system:
   for an initial document in the batch:
     controlling a search unit for obtaining image data representing an image of the initial document;
     controlling the search unit for performing a search operation of the image data of the initial document to locate a marking representing document-processing instructions and reading the document-processing instructions;
     storing a location data set indicative of the location of the marking in the memory;
     controlling least one processing unit for performing on the initial document one or more processing steps according to the document-processing instructions so as to assemble a mail item; for each later document in the batch;
     controlling the search unit for obtaining image data representing an image of the later document;
     controlling the search unit for performing a search operation of a portion of the image data of the later document corresponding to the location defined by the stored location data set to locate a marking representing document-processing instructions and reading the document-processing instructions; and
     controlling the at least one processing unit for performing on the later document one or more processing steps according to the document-processing instructions so as to assemble a mail item.

* * * * *